United States Patent [19]

Alvarez et al.

[11] Patent Number: 4,911,541
[45] Date of Patent: Mar. 27, 1990

[54] INERTIAL PENDULUM OPTICAL STABILIZER

[75] Inventors: Luis W. Alvarez, Berkeley; Stephen F. Sporer, Oakland, both of Calif.

[73] Assignee: Schwem Technology Incorporated, Pleasant Hill, Calif.

[21] Appl. No.: 178,104

[22] Filed: Apr. 6, 1988

[51] Int. Cl.$^4$ .................. G02B 27/64; G02B 23/16
[52] U.S. Cl. ............................................. 350/500
[58] Field of Search .................... 350/500; 354/77; 358/222

[56] References Cited

U.S. PATENT DOCUMENTS

| 3,434,771 | 3/1969 | Alvarez | 350/500 |
| 3,504,957 | 4/1970 | Heflinger et al. | 350/500 |
| 3,845,929 | 11/1974 | Reekie et al. | 350/500 |
| 4,013,339 | 3/1977 | Ando et al. | 350/500 |

FOREIGN PATENT DOCUMENTS 1442825  8/1973  Japan .................. 350/500

Primary Examiner—Jon W. Henry
Attorney, Agent, or Firm—Townsend and Townsend

[57] ABSTRACT

An inertial pendulum stabilizer is utilized for stabilizing the lens train of an optical instrument to be stabilized, such as a television camera, against accidental angular motion. A substantially spherical optical doublet having a leading negative lens element and a trailing positive element with both lens elements together being afocal is utilized. The leading negative lens element is fixed in front of the lens train of the optical instrument to be stabilized. An inertial pendulum has the positive optical element lens fixed to the front of the pendulum, this positive element being located between the leading negative lens and the lens train of the optical element to be stabilized. The inertial pendulum pivots on two intersecting and mutually perpendicular axes. The inertial pendulum is attached to the lens train to be stabilized so that the two mutually perpendicular and intersecting pivot axes intersect the lens train of the optical element to be stabilized. Consequently, this inertial pendulum defines an interior spatial interval exceeding the dimensions of the lens train of the optical instrument to be stabilized to enable pivot around the lens train with stabilizing excursion of the positive lens element. The inertial pendulum is counter-weighted so that the center of gravity of the pendulum is coincident to the point of intersection of the mutually perpendicular pivot axes of the pendulum. The pendulum is thus neutral to the ambient gravitational field but responsive to forces of its own inertia relative to the camera. The inertial pendulum is biased to a neutral position with respect to the lens train at low frequencies of angular motion and provided with suitable damping to minimize low frequency oscillation of the pendulum with respect to the optical train during panning of the instrument. An optical stabilizer with minimum increase in dimension relative to the optical train of the instrument to be stabilized results.

5 Claims, 2 Drawing Sheets

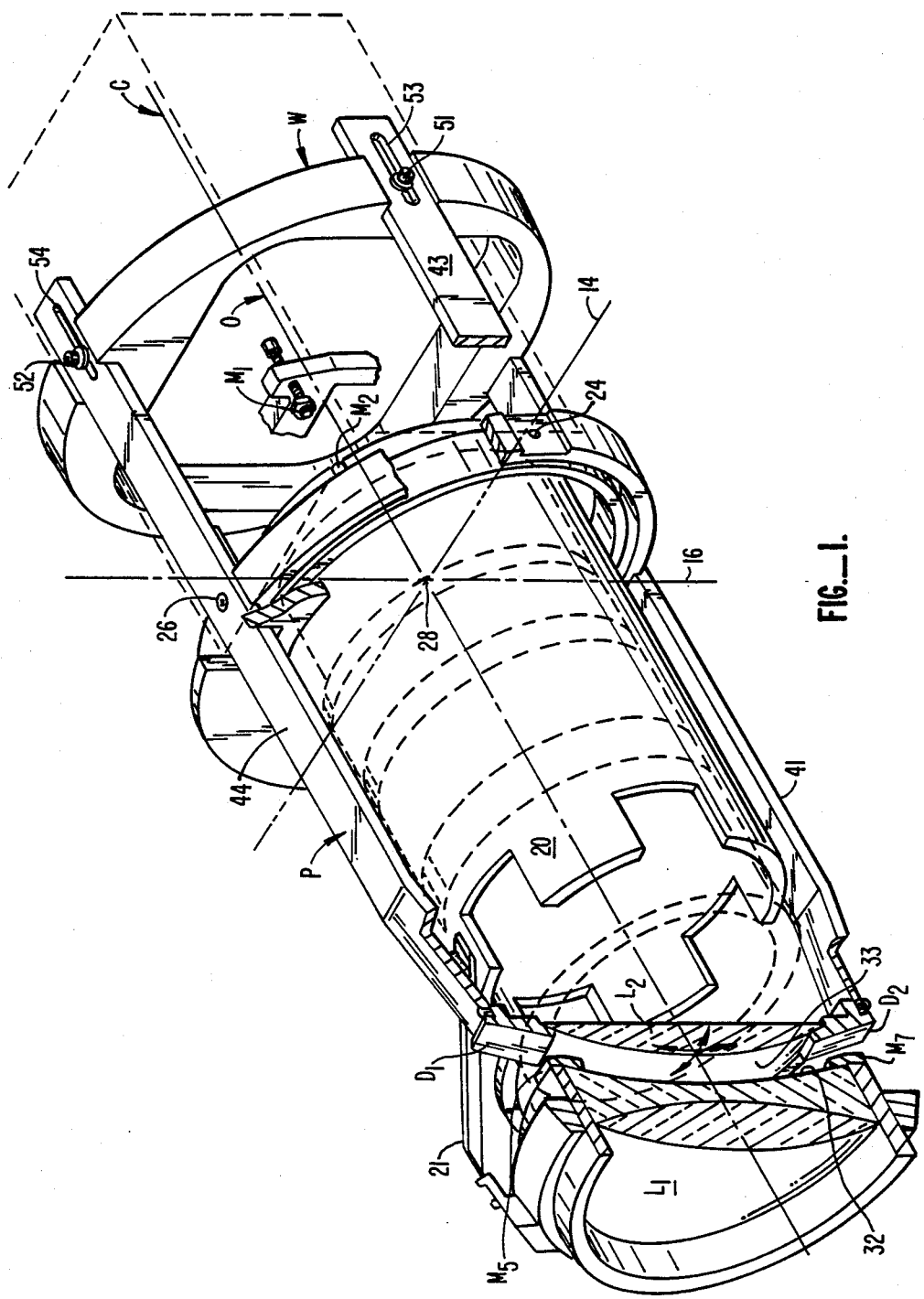
FIG._1.

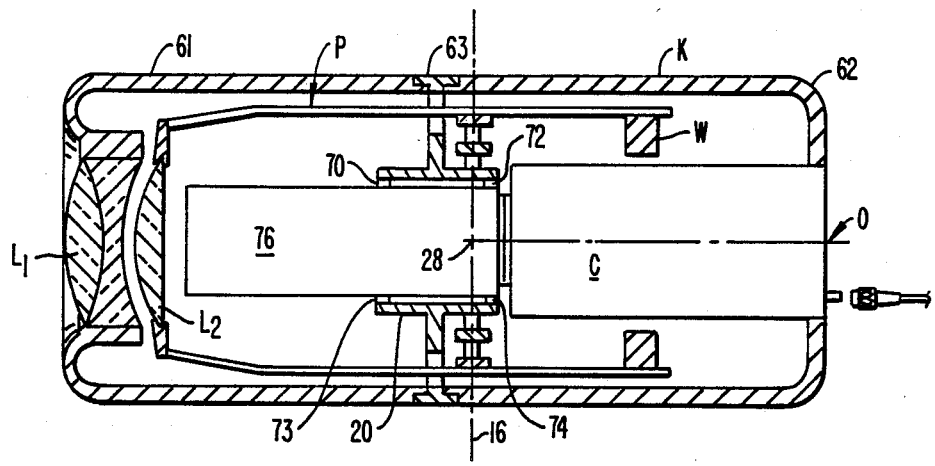
FIG._2.
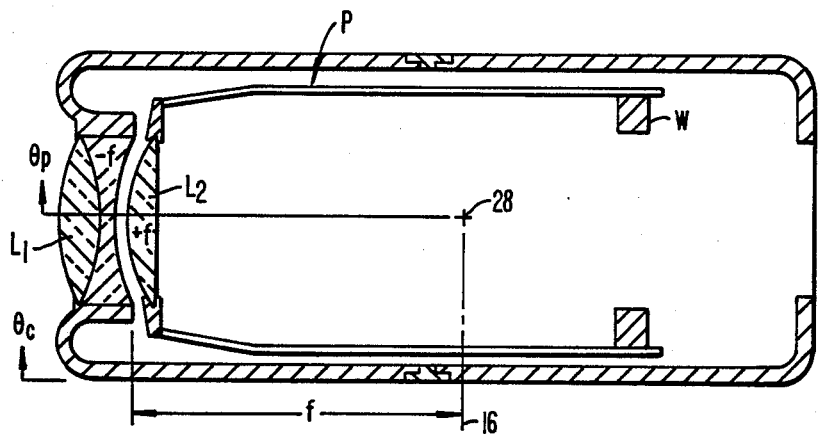
FIG._3A.
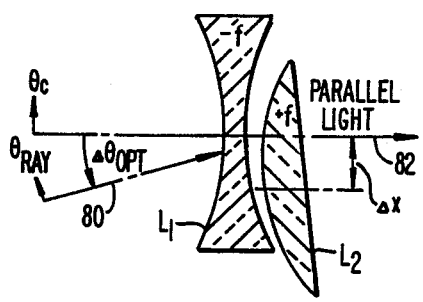
FIG._3B.
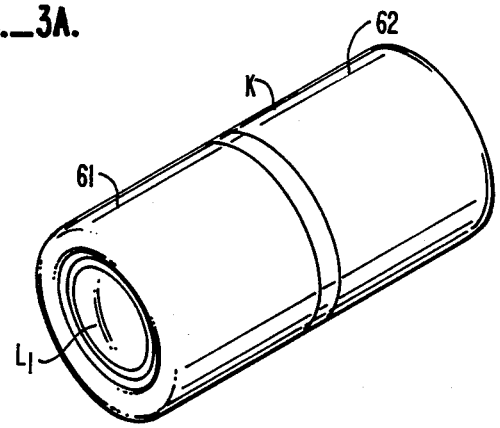
FIG._4.

INERTIAL PENDULUM OPTICAL STABILIZER

BACKGROUND OF THE INVENTION

This invention relates to optical stabilizers. More particularly, an optical stabilizer is disclosed which immediately surrounds a lens train to be stabilized to provide a minimal increase in dimension and weight of the optical instrument.

SUMMARY OF THE PRIOR ART

Optical stabilizers having spherical optical doublets, including positive and negative lenses are known. In such stabilizers, one of the doublet lenses—preferably the trailing positive lens—is stabilized against any accidental angular motion by a gimbal mounted gyroscope. The leading lens,—typically the negative lens—is fixed with the optical instrument to be stabilized. Stabilization of the image results. See L. Alvarez U.S. Pat. No. 3,378,326 entitled, "Gyroscopically Controlled Accidental Motion Compensator for Optical Instruments."

In these types of optical stabilizers, the doublets of the stabilizer must either be of an optical index of 2 (that is, n equals 2) or doublets must be placed in series ahead of the lens train.

Further, the presence of the gyroscope complicates the device. Both the precision of the instrument and the necessity of placing the gyroscope on axis or offsetting either the optical axis of the instrument or the stabilizing gyroscope causes complication. Both length, width and weight of the resultant optical instrument increases.

Further, the design of the doublets has been restricted. Specifically, and in order to create a simple prism and minimize certain other aberrations, such as coma, the curvature of the relatively moving lens elements, one to another, has been restricted to match the radius of curvature from the stabilizing gimbal axis. This has been described in the prior art as having the stabilizing lens doublet being in "rotatable mating relation" of one doublet element relative to the other doublet element.

SUMMARY OF THE INVENTION

An inertial pendulum stabilizer is utilized for stabilizing the lens train of an optical instrument to be stabilized, such as a television camera, against accidental angular motion. A substantially spherical optical doublet having a leading negative lens element and a trailing positive element with both lens elements together being a focal is utilized. The leading negative lens element is fixed in front of the lens train of the optical instrument to be stabilized. An inertial pendulum has the positive optical element lens fixed to the front of the pendulum, this positive element being located between the leading negative lens and the lens train of the optical element to be stabilized. The inertial pendulum pivots on two intersecting and mutually perpendicular axes. The inertial pendulum is attached to the lens train to be stabilized so that the two mutually perpendicular and intersecting pivot axes intersect the lens train of the optical element to be stabilized. Consequently, this inertial pendulum defines an interior spatial interval exceeding the dimensions of the lens train of the optical instrument to be stabilized to enable pivot around the lens train with stabilizing excursion of the positive lens element. The inertial pendulum is counter-weighted so that the center of gravity of the pendulum is coincident to the point of intersection of the mutually perpendicular pivot axes of the pendulum. The pendulum is thus neutral to the ambient gravitational field but responsive to forces of its own inertia relative to the camera. The inertial pendulum is biased to a neutral position with respect to the lens train at low frequencies of angular motion and provided with suitable damping to minimize low frequency oscillation of the pendulum with respect to the optical train during panning of the instrument. An optical stabilizer with minimum increase in dimension relative to the optical train of the instrument to be stabilized results.

OTHER OBJECTS, FEATURES AND ADVANTAGES

An object of this invention is to disclose a simplified, inertially stabilizing optical train for preferred use with a small camera that provides minimum extension to the length, width and weight of the optical instrument to be stabilized. Accordingly, the length of the optical instrument is only extended by that distance required for the insertion of the stabilizing lens system in front of the camera lens train. The negative element of the stabilizer is mounted to the camera and moves with the overall instrument casing. The stabilizing positive element of the stabilizer is mounted to a gravity neutral pendulum gimbal mounted on or immediately adjacent to the optical axis of the instrument to be stabilized. The pendulum defines an internal volume exceeding the volume of the lens train to be stabilized only by the amount of the positive lens element excursion anticipated. Since the pendulum center of gravity must be coincident to the gimbal axes to be neutral, the mass of the pendulum behind the pivot must surround at least the optics to stabilized, if not the body of the optical device. There results a much simplified mechanical stabilization scheme.

An advantage of the disclosed stabilizer is that gyroscopes are not required.

A further advantage of the disclosed stabilizer is that "rotatable mating relation" between the optical doublet is not required. That is to say, the lenses are no longer restricted to have mating surfaces whose center of curvatures are at the gimbal center. Simple spacing of the lens elements, one from another, will suffice.

Yet another advantage of this invention is that the pendulum is restricted to surrounding the lens train to be stabilized. Consequently, the lens train is only extended in length by the optical thickness of the stabilizer. Further, the width of the lens train and optical instrument to be stabilized is only expanded by the necessary tolerances needed for gimbal movement. Accordingly, an instrument is provided where the width and length is expanded minimally with resultant stabilization.

A further advantage due to the neutral pendulum surrounding the lens train is that the pendulum naturally has a high moment of inertia relative to the lens train. Consequently, it can have low weight. Added instrument weight with the stabilizer is held to a minimum.

We have used the term "substantially spherical" to describe the surfaces of the optical doublet. This term is intended to include aspheric lenses generated to substantially emulate the performance of spherical elements.

The reader will also realize that we intend to cover the use of so-called "compound" optical elements. That is to say one or more of the doublet elements can be of more than one optical glass and optical shape so long as the two lenses of the doublet together act afocally.

BRIEF DESCRIPTION OF THE DRAWINGS

Other objects, features and advantages of this invention will be more apparent after referring to the following specification and attached drawings in which;

FIG. 1 is a perspective view of the stabilizer of this invention mounted about a small television camera for producing a stabilized television image;

FIG. 2 is a side elevation schematic of the optical instrument of FIG. 1, it being noted that the schematic is not to the scale of FIG. 1;

FIGS. 3A and 3B are optical schematics for setting forth the respective gimballing schematic and optical power utilized for the stabilization:

FIG. 4 is a view of the stabilizer of FIG. 1 within a case illustrating the exterior appearance of the camera with minimum increases both in length and width of the stabilized optics.

DETAILED DESCRIPTION OF A SPECIFIC EMBODIMENT

Referring to FIG. 1, an inertially neutral pendulum P is shown attached about a camera C, the camera C being shown within broken lines. Camera C is attached to and constrained within a tube 20.

Pendulum P pivots about an outer horizontal axis 14 and an inner vertical axis 16 on respective pivots 24 and 26. As can be seen from the perspective of FIG. 1, these two axes have a point of intersection 28. As will hereinafter become more apparent, intersection 28 is an imaginary point within the lens train to be optically stabilized.

Two lens elements, L1 and L2, form the optical stabilizer utilized for stabilization, L1 is a negative lens element. It is attached by bars 21 to the barrel 20. This lens is in effect attached directly to the camera C. Consequently, as the camera moves, so will lens L1.

Lens L2, is a positive lens element providing to the L1, L2 lens doublet combination, an overall magnification of 1. This positive lens element L2 is attached to pendulum P. Specifically, this lens L2, like lens L1, is positioned in front of the optics of camera C and held between element L1 and the camera.

A remark may be made about the respective curved surfaces 32 of lens L1 and 33 of lens L2. It is not required in this stabilizer that the curvature of these lenses match the radius between point 28 and surfaces 32, 33. These lenses, therefore, are not in rotatable, mating engagement.

It will be seen that the doublet consisting of negative lens element L1 and positive lens element L2 have together two properties.

First, and in the neutral position, these elements are afocal—that is to say, they do not of themselves contribute to either the convergence or divergence of light. Parallel light enters and exits the doublet.

Second, and upon relative movement within the limits of stabilization (usually plus or minus 5°), the negative lens element L1 and the positive lens element L2 are together again afocal. This is to say the doublet lens element do not of themselves contribute to either the convergence or the divergence of light. Parallel light enters the doublet. This parallel light is deflected by the doublet. This deflection equals the deflection of the case relative to the inertial reference of the pendulum P.

It will be appreciated that the pivot point is substantially at the distance equal to the absolute value of plus or minus focal length of either lens elements L1 or L2. It will also be understood that with the vagaries of modern optical design, variations can occur without departing from the design concepts herein. Thus, the pivot point can be slightly off from the absolute position described by lens element focal lengths.

The reader will also understand that there will always be one unique point that will provide or the afocal performance. Minor movement from this unique point may be desired dependent upon pendulum movement. Such adjustment is believed to be within the capability of the technician.

Pendulum P includes four bars, three of which are shown. These include lower bar 41, side bar 43 and top bar 44. These respective four bars support lens element L2 at the front and a counter-weight W at the rear.

It can be seen that pendulum P is large enough to define a volume in the interior into which lens barrel 76 and camera C fits. Furthermore, pendulum P is free to move relative to the barrel 20. Since camera C is within barrel 20, it goes without saying that the pendulum P is free to move with respect to the camera optics contained in the interior portion thereof. Room is provided for excursions in the order of 10 degrees.

It can be seen that weight W is adjustable with respect to lens L2. Specifically, and on bolts 51, 52 on slots 53, 54, towards and away movement of the weight W from the lens L2 can occur.

In order for the pendulum to be gravitationally neutral, it is required that the center of gravity of the pendulum be coincident with the intersection of the pivot axis. Therefore, weight W is adjusted toward and away from lens L2 until the center of gravity of the pendulum P is coincident to the intersection 28 of axes 14, 16.

It is thus seen that the pendulum P surrounds the lens train to be stabilized. Lens L1, L2 are immediately in front of the lens train to be stabilized and constitute the only extension in length required for the disclosed stabilizer. Pendulum P requires that the width of the instrument be larger than the unstabilized instrument alone. Specifically, the width is only that width necessary to define the appropriate excursion for the pendulum P to effect stabilization. Having set forth the mechanical configuration, attention can be devoted to FIG. 2.

With respect to FIG. 2, negative lens L1 is shown affixed to a case K. Case K comes in two discrete halves, a first half 61 and a second half 62. These respective halves fit on and clamp on a flange 63 protruding upwardly from a camera C and the attached cylinder 20. As can be seen, the cylinder 20 fastens to the camera lens at stops 70, 72, 73 and 74.

Pivot axis 14 is normal to the plane of FIG. 2: pivot axis 16 is within the plane of FIG. 2. It can be seen that the point of intersection 28 intersects the optical axis 0 of both the standard camera lens 76 and the camera itself C. Here, the point of intersection 28 is shown exactly intersecting the optical axis of the camera 0. It will be realized that although this is preferred, it is not absolutely required. Offset of the point of intersection 28 can occur from the optical axis 0. Such offset can produce undesirable aberrations of the image upon excursion of the pendulum, yet without affecting the basic geometric stability of the device. It is therefore apparent that it is highly desirable to have point 28 coincident to the optical axis.

It can also be seen that the pendulum P has counterweight W disposed around both the lens 76 and the camera C. It will be apparent that where the camera body is large and the lens likewise large, it will be sufficient for the practice of this invention if the pendulum P is disposed around the lens train only.

Returning to FIG. 1 and as is known, it is important to bias the pendulum P to a neutral position with respect to the camera C. To this end, opposing magnets M1, M2 are utilized. In the view of FIG. 1, only one of four such magnets is illustrated.

The location and strength of the magnets is important. Specifically, the magnet pairs M1 and M2 are located at 90° intervals around axis 0. There are four pairs of such magnets here shown. More than three such pairs of magnets are required.

In addition, to the biasing force, a drag force is required. Accordingly, and as shown in FIG. 1, two of four symmetrically placed magnets M5, M7 produce on copper strips D1, and D2 eddy currents. These eddy currents and their coupled magnetic fields cause drag. The drag tends to suppress any oscillation of the pendulum P with respect to the camera C caused by the magnetic bias.

It will be understood that the important thing is not the number or geometry of magnets producing the drag force. It is instead that the drag force be uniformly applied to all directions of pendulum movement. In the case here illustrated, it would be possible for one magnet and copper strip centrally located to provide this effect—only such a magnet copper strip pair may well interfere with the desired optical train. We therefore show two symmetrically located elements—with four symmetrically located elements being preferred.

A word about the relative power of the magnets and the drag forces relative to the mass of the pendulum. Assuming that the pendulum is perfectly balanced, assuming forces of friction are not present with pendulum motion, and assuming the coupling is "perfect"—that is to say is "viscous damping" and has no friction force, then the presence of the coupling alone would be sufficient to maintain the neutral position to the pendulum. This "perfect" viscous damping coupling force would be opposed to the velocity of angular displacement of the pendulum.

Unfortunately, the coupling does have friction, the pendulum may not be precisely balanced, and the pendulum will be subjected to an inevitable amount of friction. This being the case, the spring force of the magnet pairs M1-M2, etc. is required. This force should be maintained as low as possible and will always direct the pendulum back to the neutral position. This force will introduce amounts of "over shoot" of stabilization when instrument movement changes. Adjustment of the force of the repelling magnet pairs to as low as possible a force is desirable for optimum stabilization.

Having set forth the mechanical suspension and bias on the pendulum P, attention can be directed to the power of the optics. Referring to 3A, lens L1 and L2 are shown supported by the schematically illustrated pendulum P having the counter-weight W. Lenses L1 and L2 when combined are afocal. That is to say, the negative focal length of negative lens L1 approximately equals the positive focal length of lens L2. While it is seen that the lenses have slightly different distances from the point of intersection 28, the reader will understand than an optical designer, given the task of making the combined stabilizing system afocal, can easily generate lenses to that order.

Referring to FIG. 3B, it can be seen that the negative lens F1 has undergone with the case an angular excursion $\Delta\theta$. Using the tangent approximation, it can be seen that the displacement $\Delta X$ divided by the focal length will equal the angular displacement $\Delta\theta$. Light will be received from an object along plane 80. Light will emanate to the camera along plane 82. Thus, the entrance of the standard lens 76 (see FIG. 2) will experience parallel light. This parallel light will enable standard lens 76 to be any conventional optic. For example, standard lens 76 may as well be a zoom optic utilized.

The term "parallel light" is used loosely. Where the optics of the camera are focused on objects not at practical optical infinity, stabilization will never the less occur.

What has been illustrated is an extremely simple pendulum. This pendulum encompasses, surrounds and moves relative to and about at least the lens train of the optical instrument to be stabilized. By relative movement of the positive and negative lens element of an afocal optical doublet, stabilization occurs. Such a simple configuration enables a simple, yet elegant manufacture of a stabilizer.

What is claimed is:

1. An inertial pendulum actuated optical stabilizer for mounting to and about the lens train of an optical instrument to be stabilized, said instrument and stabilizer comprising:

an optical instrument to be stabilized, said optical instrument including an instrument body having a lens train for receiving light to said instrument body, said lens train having a front end and a rear end relative to the optical axis of the lens train of the instrument to be stabilized;

an optical doublet having a leading negative lens element and a trailing positive lens element, said elements in combination being afocal;

means fixing said negative lens in front of and for movement with the lens train of the optical instrument to be stabilized;

an inertial pendulum pivoting on two intersecting and mutually perpendicular axis, said inertial pendulum being symmetrical about the optical axis and extending past the front and rear end of the lens train to enable said pendulum to pivot around said optical instrument at least at said lens train;

means attaching said inertial pendulum around the optical axis of said lens train of said optical instrument to be stabilized so that the two mutually perpendicular and intersecting pivot axes intersect with the optical instrument to be stabilized at least at said lens train;

means fixing said trailing positive lens to the inertial pendulum as a part of the mass of said pendulum in between said leading negative lens and said lens train of said optical instrument to be stabilized;

means locating said intersection of said mutually perpendicular pivot axes at the distance behind the optical doublet which provides substantially afocal deflection equal and opposite to case deflection due to relative movement of the elements of said doublet due to inertial reference of said pendulum;

a counter-weight attached to said inertial pendulum for coinciding the center of gravity of said inertial pendulum to the point of intersection of said mutually perpendicular axes, said counter weight pivoting about said optical instrument to be stabilized at a location to counter balance said trailing positive lens at least at said lens train;

means biasing said pendulum to a neutral position with respect to said lens train to be stabilized at low frequencies of angular motion relative to said case to provide a following motion of said pendulum to panning of said optical instruments; and means for damping said pendulum with respect to said optical train of said optical instrument to be stabilized upon displacement of said pendulum with respect to the optical train of said instrument.

2. The invention of claim 1 wherein said counterweight surrounds continuously the lens train of the optical instrument to be stabilized.

3. The invention of claim 2 wherein said counterweight is adjustable towards and away from said mutually perpendicular pivot axes.

4. The invention of claim 1 wherein said means for biasing said pendulum to a neutral position comprises opposed magnets.

5. The invention of claim 1 wherein said means for damping said pendulum includes a magnet attached to said pendulum and a copper strip attached to said camera to induce between said magnet and camera a coupled electromagnetic eddy current field for damping said pendulum.

* * * * *